(12) United States Patent
Lee et al.

(10) Patent No.: US 12,344,318 B2
(45) Date of Patent: Jul. 1, 2025

(54) REAR VEHICLE BODY STRUCTURE

(71) Applicants: Hyundai Motor Company, Seoul (KR); Kia Corporation, Seoul (KR)

(72) Inventors: HaeHoon Lee, Seoul (KR); Jungho Lee, Suwon-si (KR); Chan Woong Jeon, Incheon (KR); Chulhee Heo, Hwaseong-si (KR); ChangHak Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 353 days.

(21) Appl. No.: 17/979,436

(22) Filed: Nov. 2, 2022

(65) Prior Publication Data

US 2023/0211828 A1    Jul. 6, 2023

(30) Foreign Application Priority Data

Jan. 6, 2022    (KR) .................. 10-2022-0002094

(51) Int. Cl.
*B62D 25/08* (2006.01)
*B62D 25/04* (2006.01)
*B62D 25/20* (2006.01)
*B62D 27/02* (2006.01)

(52) U.S. Cl.
CPC ............. *B62D 25/08* (2013.01); *B62D 25/04* (2013.01); *B62D 25/2027* (2013.01); *B62D 27/023* (2013.01)

(58) Field of Classification Search
CPC .... B62D 25/04; B62D 25/08; B62D 25/2027; B62D 27/023
USPC ......... 296/203.01, 4, 29, 30, 193.03, 8, 26.8
See application file for complete search history.

(56) References Cited

U.S. PATENT DOCUMENTS

| 4,887,859 | A | * | 12/1989 | Aper | B62D 47/006 296/193.03 |
| 6,102,470 | A | * | 8/2000 | Heim | B62D 25/087 293/133 |
| 8,801,084 | B2 | * | 8/2014 | Gonin | B60J 5/101 296/187.11 |
| 10,899,393 | B2 | * | 1/2021 | Nakayama | B62D 25/02 |

FOREIGN PATENT DOCUMENTS

CN    113734292 A    * 12/2021

OTHER PUBLICATIONS

CN113734292 text (Year: 2021).*

* cited by examiner

*Primary Examiner* — Dennis H Pedder
(74) *Attorney, Agent, or Firm* — Slater Matsil, LLP

(57) ABSTRACT

An embodiment rear vehicle body structure includes a rear vehicle body assembly and a rear end module connected to the rear vehicle body assembly in a length direction of a vehicle body. An embodiment rear vehicle body assembly includes a roof rail, quarter completions connected to each end of the roof rail, respectively, and a back panel connecting the quarter completions.

17 Claims, 9 Drawing Sheets

REAR VEHICLE BODY STRUCTURE

CROSS-REFERENCE TO RELATED APPLICATIONS

This application claims the benefit of Korean Patent Application No. 10-2022-0002094, filed on Jan. 6, 2022, which application is hereby incorporated herein by reference.

TECHNICAL FIELD

The present invention relates to a rear vehicle body structure.

BACKGROUND

In general, the rear part of the vehicle, which is sensitive to strength, is welded with a steel press part to secure the vehicle's skeletal strength. Pressed parts made of steel material are used to suppress torsion, and a closed cross-section is formed by mutual welding.

However, the closed cross-section of the thin plate including the side outer and the combination extension can include a thin plate to realize the design of the part and secure the formability.

In other words, in order to satisfy the structural requirements of an elegant and complex exterior design, an additional reinforcement configuration or reinforced closed cross-section is required to reinforce the closed cross-section of a thin plate with low strength efficiency.

The above information disclosed in this background section is only for enhancement of understanding of the background of embodiments of the invention, and therefore it may contain information that does not form the prior art that is already known to a person of ordinary skill in the art.

SUMMARY

The present invention relates to a rear vehicle body structure. Particular embodiments relate to a rear vehicle body structure with improved vehicle body strength.

Embodiments of the present invention provide a rear vehicle body structure with improved vehicle body strength.

In addition, embodiments of the present invention provide a rear vehicle body structure that can improve productivity by simplifying the assemble structure.

A rear vehicle body structure according to an exemplary embodiment of the present invention may include a rear vehicle body assembly and a rear end module connected to the rear vehicle body assembly in the length direction of the vehicle body.

The rear vehicle body assembly may include a roof rail, a quarter completion connected to each end of the roof rail, and a back panel connecting both quarter completions.

The quarter completion may include a quarter completion inner with an inner protruded portion formed in the vehicle body inner direction and a quarter completion outer connected with the quarter completion inner by forming an outer protruded portion in the vehicle body outer direction to form a completion closed cross-section together with the inner protruded portion.

The rear end module may include a center body forming an end module closed cross-section together with the quarter completion outer.

The completion closed cross-section and the end module closed cross-section may be formed adjacent.

The rear end module may further include an end module inner rib protruded from the center body to the inward direction of the end module closed cross-section.

The rear end module may further include an end module inner reinforcement portion protruded to form an end module inner closed cross-section inside the end module closed cross-section.

The quarter completion outer may further include a completion outer extension surface formed extending in a direction outside the vehicle body of the completion closed cross-section. And the quarter completion inner may further include an inner end protruded portion formed inside the vehicle body to form a completion outer closed cross-section together with the completion outer extension surface.

The rear end module may further include an end module outer reinforcement portion protruded in the front direction of the vehicle body so as to be in close contact with the completion outer closed cross-section.

The rear end module may further include an end module outer rib protruded from the end module outer reinforcement portion in the vehicle body outer direction.

The rear vehicle body structure according to an exemplary embodiment of the present invention may further include a side cover connected to the rear end module to form a side closed cross-section together with the end module outer reinforcement portion.

The side cover may include a cover rib protruded in the inner direction of the side closed cross-section.

The side cover may further include a cover inner rib formed to protrude to support the end module closed cross-section.

The back panel may include an inner back panel and an outer back panel including a back panel protruded portion protruded out of the vehicle body to form a back closed cross-section together with the inner back panel. And the rear end module may include a panel reinforcement surface surrounding the back closed cross-section and panel ribs protruded from the panel reinforcement surface.

A lamp mounting hole may be formed to mount a rear lamp to the rear end module.

A bumper mounting bracket may be formed to mount a rear bumper to the rear end module.

An end module bonding portion adhesively connected to the rear vehicle body assembly may be formed on the rear end module.

A connection bolt hole may be formed to the rear vehicle body assembly, and a connection protruded portion corresponding to the connection bolt hole may be formed to the rear end module.

The rear end module may be injection molded.

The rear end module may be formed in a closed shape completely enclosing the rear vehicle body assembly.

According to the rear vehicle body structure according to an exemplary embodiment of the present invention, it is possible to increase the vehicle body strength through a simple coupling structure, and it is possible to improve productivity by simplifying the assemble structure.

In addition, the effects that can be obtained or predicted by an exemplary embodiment of the present invention will be disclosed directly or implicitly in the detailed description of exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference in describing exemplary embodiments of the present invention, the tech

DETAILED DESCRIPTION OF ILLUSTRATIVE EMBODIMENTS

Figure 1:
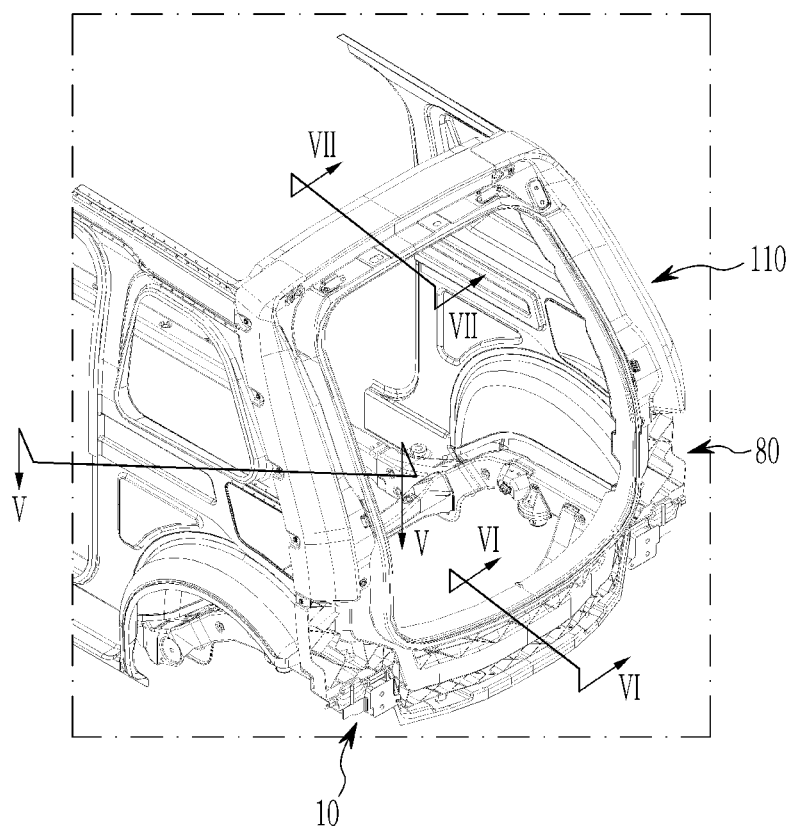
- FIG. 1 is a partial perspective view of a vehicle body to which a rear vehicle body structure according to an exemplary embodiment of the present invention may be applied.

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar elements throughout the specification.

Since the size and thickness of each component shown in the drawings are arbitrarily indicated for convenience of description, embodiments of the present invention are not necessarily limited to that shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as . . . part and . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

Figure 2:
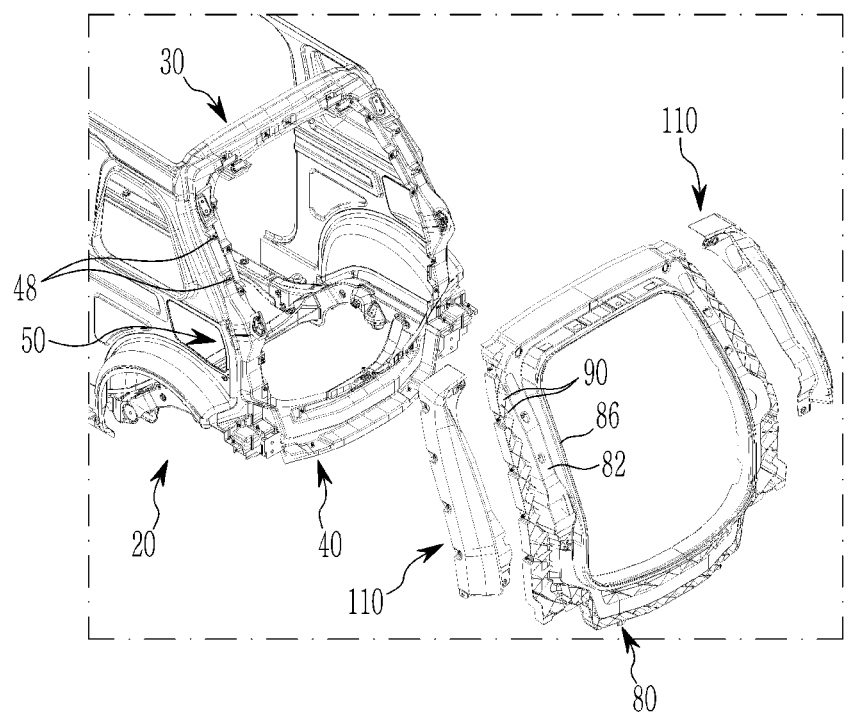
FIG. 2 is a partially exploded perspective view of a vehicle body to which the rear vehicle body structure according to an exemplary embodiment of the present invention may be applied.

FIG. 1 is a partial perspective view of a vehicle body to which a rear vehicle body structure according to an exemplary embodiment of the present invention may be applied, and FIG. 2 is a partially exploded perspective view of a vehicle body to which the rear vehicle body structure according to an exemplary embodiment of the present invention may be applied.

Referring to FIG. 1 and FIG. 2, a rear vehicle body structure according to an exemplary embodiment of the present invention may include a rear vehicle body assembly 20 and a rear end module 80 that is connected to the rear vehicle body assembly 20 in the length direction of the vehicle body.

The rear vehicle body assembly 20 may include a roof rail 30, quarter completions 50 connected to each end of the roof rail 30, and a back panel 40 connecting the quarter completions 50.

As shown in the drawing, the rear vehicle body assembly 20 may form a vehicle body rear structure of a closed shape by combining the roof rail 30, the quarter completions 50, and the back panel 40.

However, it is not limited thereto, but it is also applicable to structures with a partially open shape.

The parts forming the rear vehicle body assembly 20 may be joined by welding or the like as a metal material.

However, the rear vehicle body structure according to exemplary embodiments of the present invention is not limited thereto, and some configurations are made of non-metallic plastics, for example, carbon fiber reinforced plastics (CFRPs) and the like.

The rear end module 80 may have a closed shape surrounding the rear vehicle body assembly 20.

As shown in the drawing, the rear end module 80 may be formed in a closed shape completely enclosing the rear vehicle body assembly 20, but it is not limited thereto, and a rear end module of an open shape with some configurations is also applicable.

In addition, the rear end module 80 combined with the rear vehicle body assembly 20 may be injection molded.

The rear end module 80 may be formed as parts forming the design of the vehicle, and by molding into an integral annular structure through injection, the number of parts may be reduced and the manufacturing process may be simplified.

In addition, by applying the rear vehicle body assembly 20 to the same vehicle type, and combining the rear end module 80 with various designs to the rear vehicle body assembly 20, it is possible to easily diversify the design of the vehicle.

In addition, the rear end module 80 may be applied to various vehicle types to lower the overall production cost.

Figure 3:
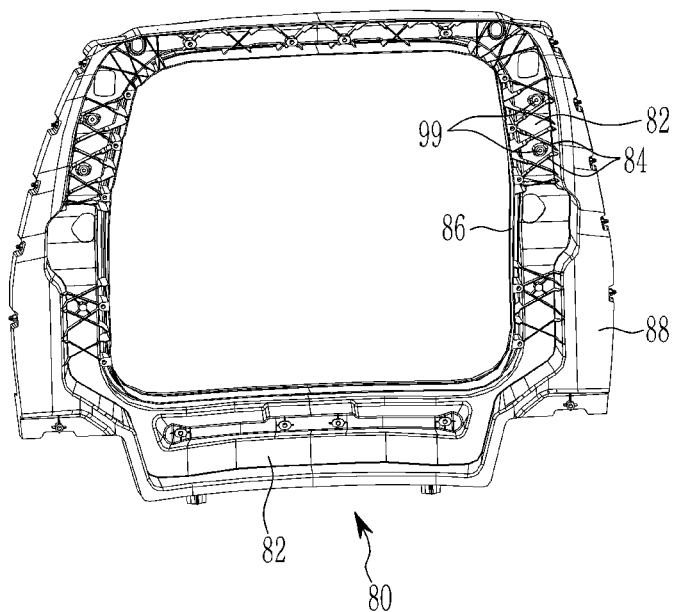
FIG. 3 is a perspective view of a rear end module that may be applied to the rear vehicle body structure according to an exemplary embodiment of the present invention.
Figure 4:
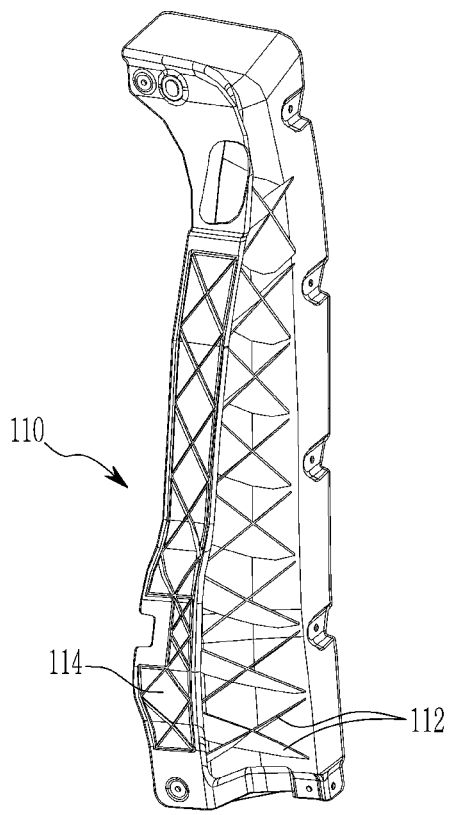
FIG. 4 is a perspective view of a side cover that may be applied to the rear vehicle body structure according to an exemplary embodiment of the present invention.
Figure 5:
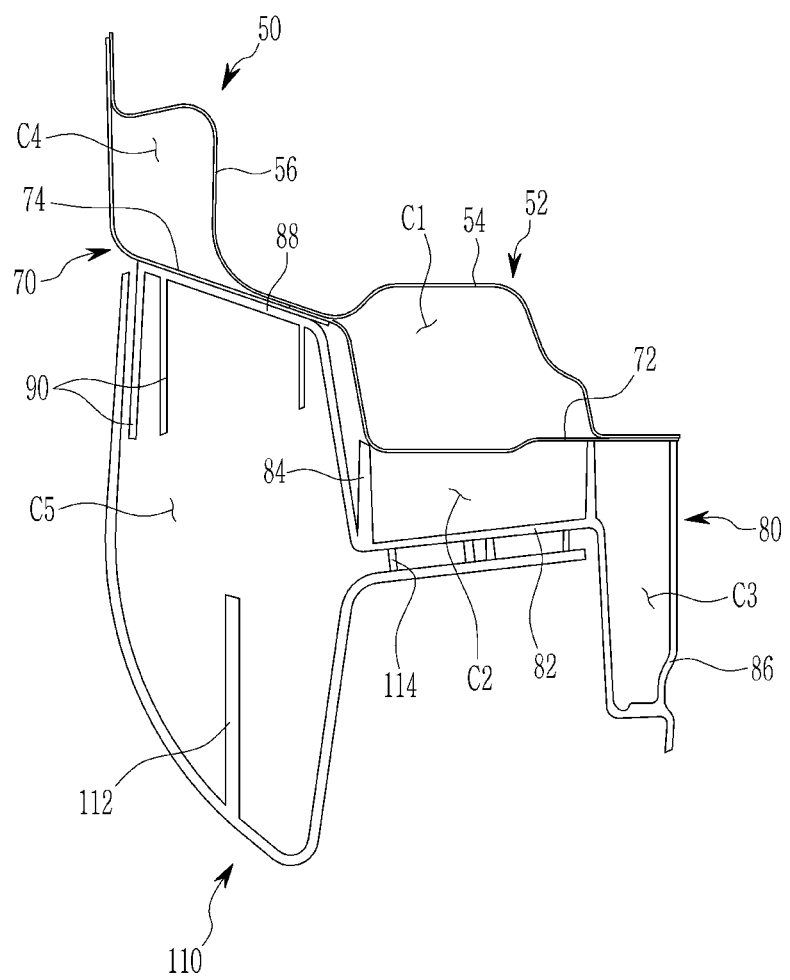
FIG. 5 is a cross-sectional view along line V-V of FIG. 1.

FIG. 3 is a perspective view of a rear end module that may be applied to the rear vehicle body structure according to an exemplary embodiment of the present invention, FIG. 4 is a perspective view of a side cover that may be applied to the rear vehicle body structure according to an exemplary embodiment of the present invention, and FIG. 5 is a cross-sectional view along line V-V of FIG. 1.

Referring to FIG. 1 to FIG. 5, the quarter completion 50 may include a quarter completion inner 52 having an inner protruded portion 54 formed in the vehicle body inner direction, and a quarter completion outer 70 connected with the quarter completion inner 52 by forming an outer protruded portion 72 in the vehicle body outer direction to form a completion closed cross-section C1 together with the inner protruded portion 54.

The rear end module 80 may include a center body 82 forming an end module closed cross-section C2 together with the quarter completion outer 70.

The completion closed cross-section C1 and the end module closed cross-section C2 may be formed adjacent to each other.

Since the quarter completion inner 52 and the quarter completion outer 70 form the completion closed cross-section C1, and the quarter completion outer 70 and the center body 82 form the end module closed cross-section C2, a double closed cross-section is formed, through which the rear strength of the vehicle body may be increased.

The rear end module 80 may further include an end module inner rib 84 protruded from the center body 82 to the inward direction of the end module closed cross-section C2.

The end module inner rib 84 may enhance the strength of the end module closed cross-section C2 and absorb impact in the event of a vehicle body rear impact.

The rear end module 80 may further include an end module inner reinforcement portion 86 protruded to form an end module inner closed cross-section C3 inside the end module closed cross-section C2.

The protruded shape of the end module inner reinforcement portion 86 may increase the cross-section coefficient of the rear end module 80 and form a closed shape of a vehicle body rear structure along the inner direction of the rear end module 80.

In addition, the end module inner reinforcement portion 86 may stably support the tail gate (not shown) to suppress vibration or noise generation during vehicle operation.

The quarter completion outer 70 further includes a completion outer extension surface 74 formed extending in a direction outside the vehicle body of the completion closed cross-section C1, and the quarter completion inner 52 further includes an inner end protruded portion 56 formed inside the vehicle body to form a completion outer closed cross-section C4 together with the completion outer extension surface 74.

Since the completion outer extension surface 74 and the inner end protruded portion 56 form the completion outer closed cross-section C4, strength of the vehicle body side and rear may be increased.

The rear end module 80 may further include an end module outer reinforcement portion 88 protruded in the front direction of the vehicle body so as to be in close contact with the completion outer closed cross-section C4.

The end module outer reinforcement portion 88 is in close contact with the completion outer closed cross-section C4 to increase the strength of the vehicle body side and rear.

The rear end module 80 may further include an end module outer rib 90 protruded from the end module outer reinforcement portion 88 in the vehicle body outer direction.

The end module outer rib 90 is formed adjacent to the completion outer closed cross-section C4 to increase the strength of the vehicle body side and rear, and it is possible to absorb the impact in the event of a rear collision of the vehicle.

The rear vehicle body structure according to an exemplary embodiment of the present invention may further include a side cover 110 connected to the rear end module 80 to form a side closed cross-section C5 together with the end module outer reinforcement portion 88.

The completion outer closed cross-section C4 and the side closed cross-section C5 form a double closed cross-section to increase vehicle body strength and to absorb impact and distribute impact in the event of a vehicle rear collision.

The side cover no may include a cover rib 112 protruded in the inner direction of the side closed cross-section C5.

The cover rib 112 may enhance the strength of the side closed cross-section C5 and may absorb impact in a rear collision to protect the vehicle body and occupant.

The side cover no may further include a cover inner rib 114 formed to protrude to support the end module closed cross-section C2.

The cover inner rib 114 may increase the strength of the end module closed cross-section C2, and it is possible to absorb the impact in the event of a vehicle rear collision.

The side cover no may be formed in various shapes even in a single vehicle type to improve the appearance of the rear of the vehicle, thereby increasing the design degree of freedom of the vehicle.

In addition, the side cover no may cover the rear vehicle body assembly 20 and the rear end module 80 to prevent damage to the rear vehicle body assembly 20 and the rear end module 80 in the event of a light collision of the vehicle.

Figure 6:
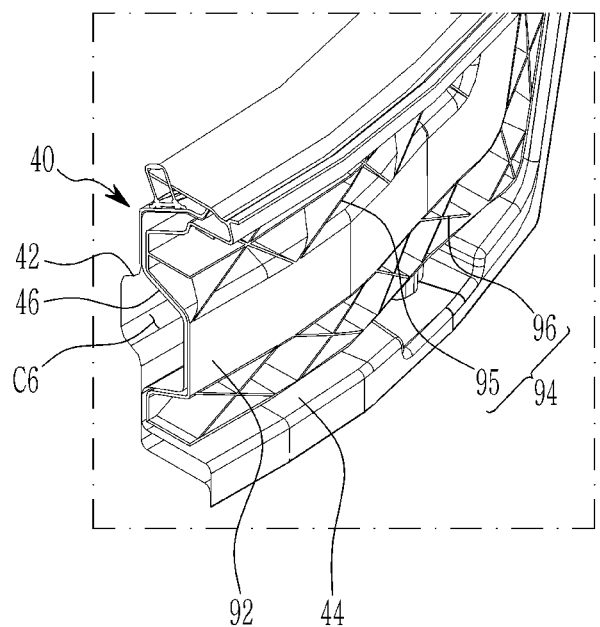
FIG. 6 is a cross-sectional perspective view along line VI-VI of FIG. 1.

FIG. 6 is a cross-sectional perspective view along line VI-VI of FIG. 1.

Referring to FIG. 1, FIG. 2, and FIG. 6, the back panel 40 may include an inner back panel 42 and an outer back panel 44 including a back panel protruded portion 46 protruded out of the vehicle body to form a back closed cross-section C6 together with the inner back panel 42.

The rear end module 80 may include a panel reinforcement surface 92 surrounding the back closed cross-section C6 and panel ribs 94 protruded from the panel reinforcement surface 92.

That is, the inner back panel 42 and the outer back panel 44 form the back closed cross-section C6 to increase the strength of the rear of the vehicle body, and the panel ribs 94 are formed around the back closed cross-section C6, so that the impact in the event of a rear collision of the vehicle may be absorbed.

In FIG. 6, the panel ribs 94 are shown to include a panel upper rib 95 formed above the back closed cross-section C6 and a panel lower rib 96 formed below the back closed cross-section C6, but the embodiments are not limited thereto.

Figure 7:
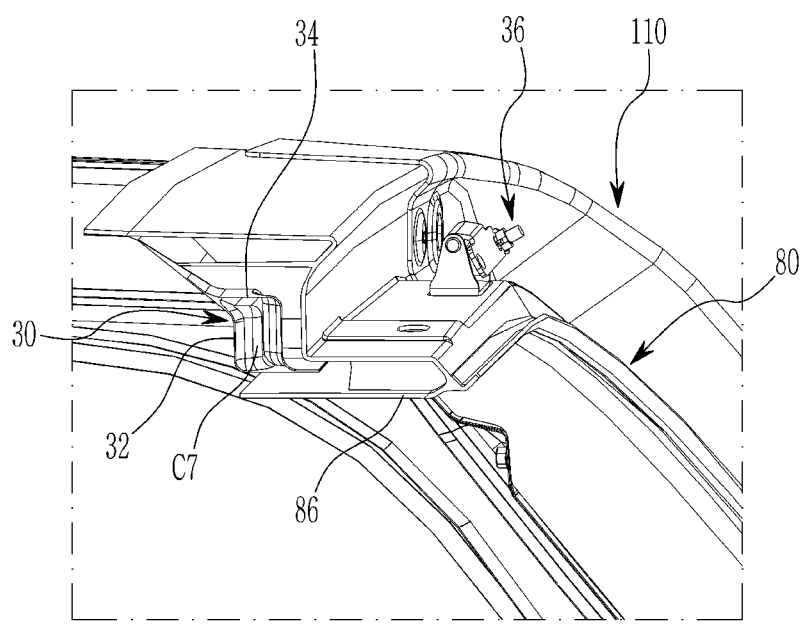
FIG. 7 is a cross-sectional perspective view along line VII-VII of FIG. 1.

FIG. 7 is a cross-sectional perspective view along line VII-VII of FIG. 1.

Referring to FIG. 1, FIG. 2, and FIG. 7, the roof rail 30 may include a roof rail lower 32 and a roof rail upper 34.

The roof rail lower 32 and the roof rail upper 34 are combined to form a roof rail closed cross-section C7, and the roof rail closed cross-section C7 may increase the strength of the rear of the vehicle body by increasing the cross-section coefficient.

The end module inner reinforcement portion 86 of the rear end module 80 is disposed adjacent to the roof rail closed cross-section C7, and a mounting gate hinge 36 for mounting a tail gate is provided on the end module inner reinforcement portion 86 connected with the roof rail lower 32 and the roof rail upper 34.

Figure 8:
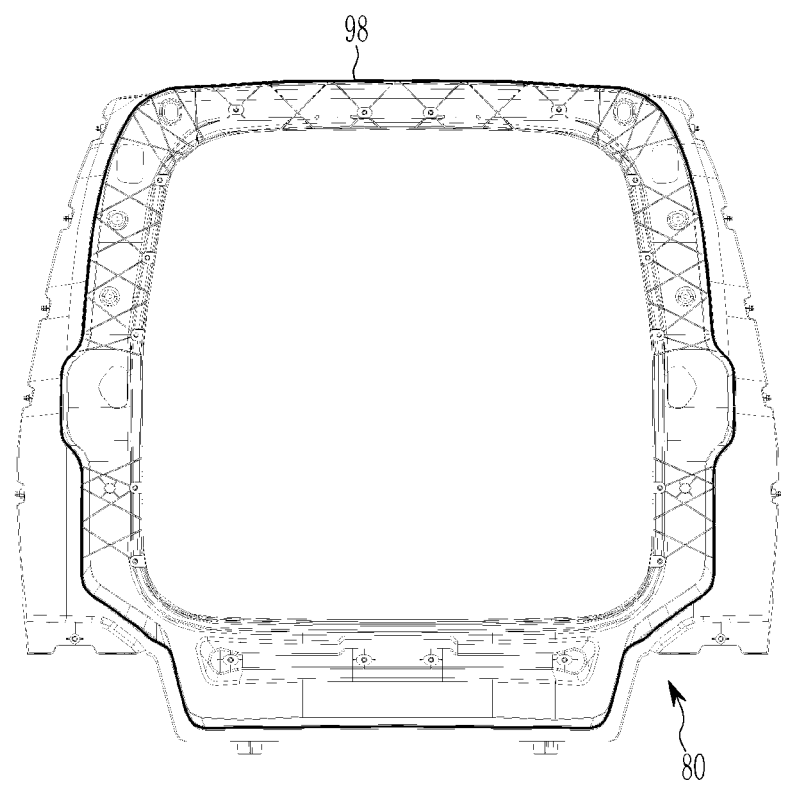
FIG. 8 is a drawing showing an end module bonding portion of the rear end module that may be applied to the rear vehicle body structure according to an exemplary embodiment of the present invention.

FIG. 8 is a drawing showing an end module bonding portion of the rear end module that may be applied to the rear vehicle body structure according to an exemplary embodiment of the present invention.

Referring to FIG. 1, FIG. 2, and FIG. 8, an end module bonding portion 98 adhesively connected to the rear vehicle body assembly 20 may be formed on the rear end module 80.

The rear vehicle body assembly 20 of the metal material and the rear end module 80 formed by plastic injection may be bonded through the end module bonding portion 98, and the adhesive acts as a sealant to block the inflow of foreign substances.

Referring to FIG. 2 and FIG. 3, a connection bolt hole 48 may be formed to the rear vehicle body assembly 20, and a connection protruded portion 99 corresponding to the connection bolt hole 48 may be formed to the rear end module 80.

Through the connection bolt hole 48 and the connection protruded portion 99, the rear vehicle body assembly 20 and the rear end module 80 may be bolted together to improve the engage strength of the rear vehicle body assembly 20 and the rear end module 80.

Figure 9:
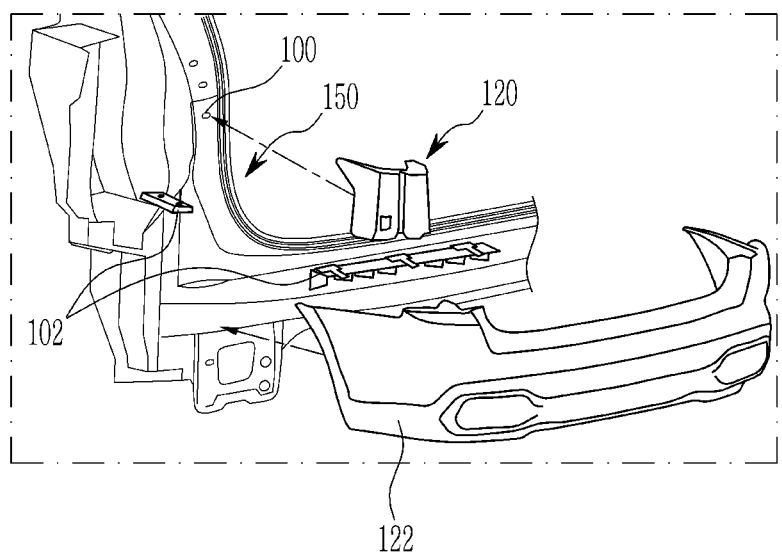
FIG. 9 is a drawing showing a connection of the vehicle body and a rear lamp and a rear bumper that may be applied to the rear vehicle body structure according to an exemplary embodiment of the present invention.

FIG. 9 is a drawing showing a connection of the vehicle body and a rear lamp and a rear bumper that may be applied to the rear vehicle body structure according to an exemplary embodiment of the present invention.

A lamp mounting hole 100 may be formed to mount a rear lamp 120 to the rear end module 80.

In addition, a bumper mounting bracket 102 may be formed to mount a rear bumper 122 to the rear end module 80.

In other words, it is easy to combine the rear lamp 120 or the bumper mounting bracket 102 to the rear end module 80, so the design degree of freedom may be increased without modification of the vehicle body.

As described above, according to the rear vehicle body structure according to an exemplary embodiment of the present invention, the vehicle body strength may be increased through a simple coupling structure, and productivity may be improved by simplifying the assemble structure.

In addition, the rear end module may secure the strength of the vehicle body and increase the design degree of freedom, so various designs may be applied to different vehicle types.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rear vehicle body structure comprising:
   a rear vehicle body assembly, the rear vehicle body assembly comprising:
   a roof rail;
   quarter completions connected to each end of the roof rail, respectively; and
   a back panel connecting the quarter completions, the back panel comprising:
   an inner back panel; and
   an outer back panel comprising a back panel protruding portion protruding out of a vehicle body to provide a closed cross-section together with the inner back panel; and
   a rear end module connected to the rear vehicle body assembly in a length direction of the vehicle body, the rear end module comprising:
   a panel reinforcement surface adjacent to the closed cross-section; and
   panel ribs protruding from the panel reinforcement surface, the panel ribs comprising:
   a panel upper rib arranged above the closed cross-section; and
   a panel lower rib arranged below the closed cross-section.

2. The rear vehicle body structure of claim 1, wherein a lamp mounting hole is provided to mount a rear lamp to the rear end module.

3. The rear vehicle body structure of claim 1, wherein a bumper mounting bracket is provided to mount a rear bumper to the rear end module.

4. The rear vehicle body structure of claim 1, an end module bonding portion adhesively connected to the rear vehicle body assembly is provided on the rear end module.

5. The rear vehicle body structure of claim 1, wherein:
   a connection bolt hole is provided to the rear vehicle body assembly; and
   a connection protruding portion corresponding to the connection bolt hole is provided to the rear end module.

6. The rear vehicle body structure of claim 1, wherein the rear end module is an injection molded rear end module.

7. The rear vehicle body structure of claim 1, wherein the rear end module has a closed shape completely enclosing the rear vehicle body assembly.

8. A rear vehicle body structure comprising:
   a rear vehicle body assembly comprising:
   a roof rail;
   quarter completions connected to each end of the roof rail, respectively, wherein each of the quarter completions comprises:
   a quarter completion inner comprising an inner protruding portion provided in an inner direction of a vehicle body; and
   a quarter completion outer connected with the quarter completion inner by providing an outer protruding portion in an outer direction of the vehicle body, the inner protruding portion and the outer protruding portion providing a completion closed cross-section; and
   a back panel connecting the quarter completions; and
   a rear end module connected to the rear vehicle body assembly in a length direction of the vehicle body,
   wherein the quarter completion outer further comprises a completion outer extension surface extending in a direction outside the vehicle body of the completion closed cross-section, and
   wherein the quarter completion inner further comprises an inner end protruding portion inside the vehicle body, the inner end protruding portion and the completion outer extension surface providing a completion outer closed cross-section.

9. The rear vehicle body structure of claim 8, wherein the rear end module comprises a center body providing an end module closed cross-section together with the quarter completion outer.

10. The rear vehicle body structure of claim 9, wherein the completion closed cross-section and the end module closed cross-section are adjacent to one another.

11. The rear vehicle body structure of claim 9, wherein the rear end module further comprises an end module inner rib protruding from the center body to an inward direction of the end module closed cross-section.

12. The rear vehicle body structure of claim 9, wherein the rear end module further comprises an end module inner reinforcement portion protruding to provide an end module inner closed cross-section inside the end module closed cross-section.

13. The rear vehicle body structure of claim 12, wherein the rear end module further comprises an end module outer reinforcement portion protruding in a front direction of the vehicle body and in close contact with the completion outer closed cross-section.

14. The rear vehicle body structure of claim 13, wherein the rear end module further comprises an end module outer rib protruding from the end module outer reinforcement portion in the outer direction of the vehicle body.

15. The rear vehicle body structure of claim 13, further comprising a side cover connected to the rear end module to provide a side closed cross-section together with the end module outer reinforcement portion.

16. The rear vehicle body structure of claim 15, wherein the side cover comprises a cover rib protruding in an inner direction of the side closed cross-section.

17. The rear vehicle body structure of claim 15, wherein the side cover further comprises a cover inner rib protruding to support the end module closed cross-section.

* * * * *